Nov. 18, 1969  O. L. SIWERSSON ET AL  3,478,970
MANURE SPREADERS
Filed April 1, 1968  5 Sheets-Sheet 2
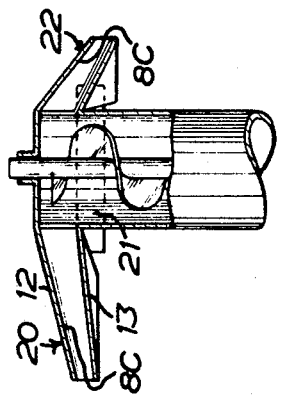
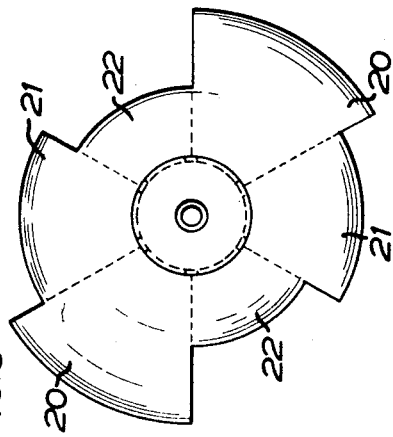
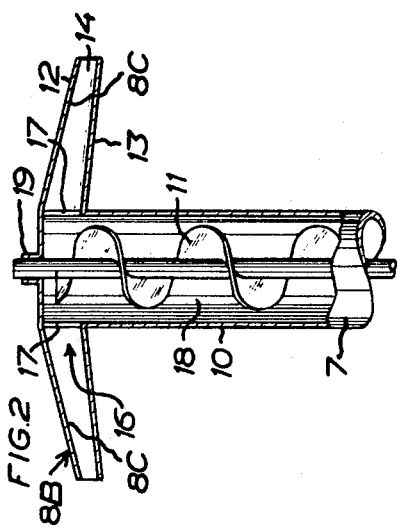
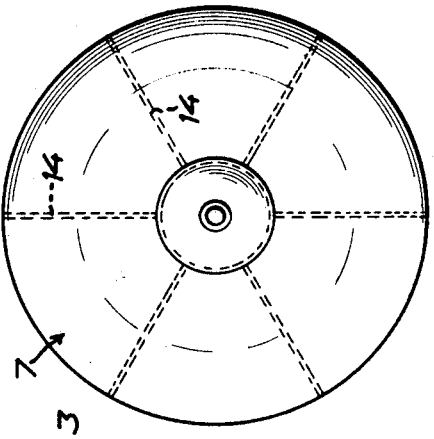

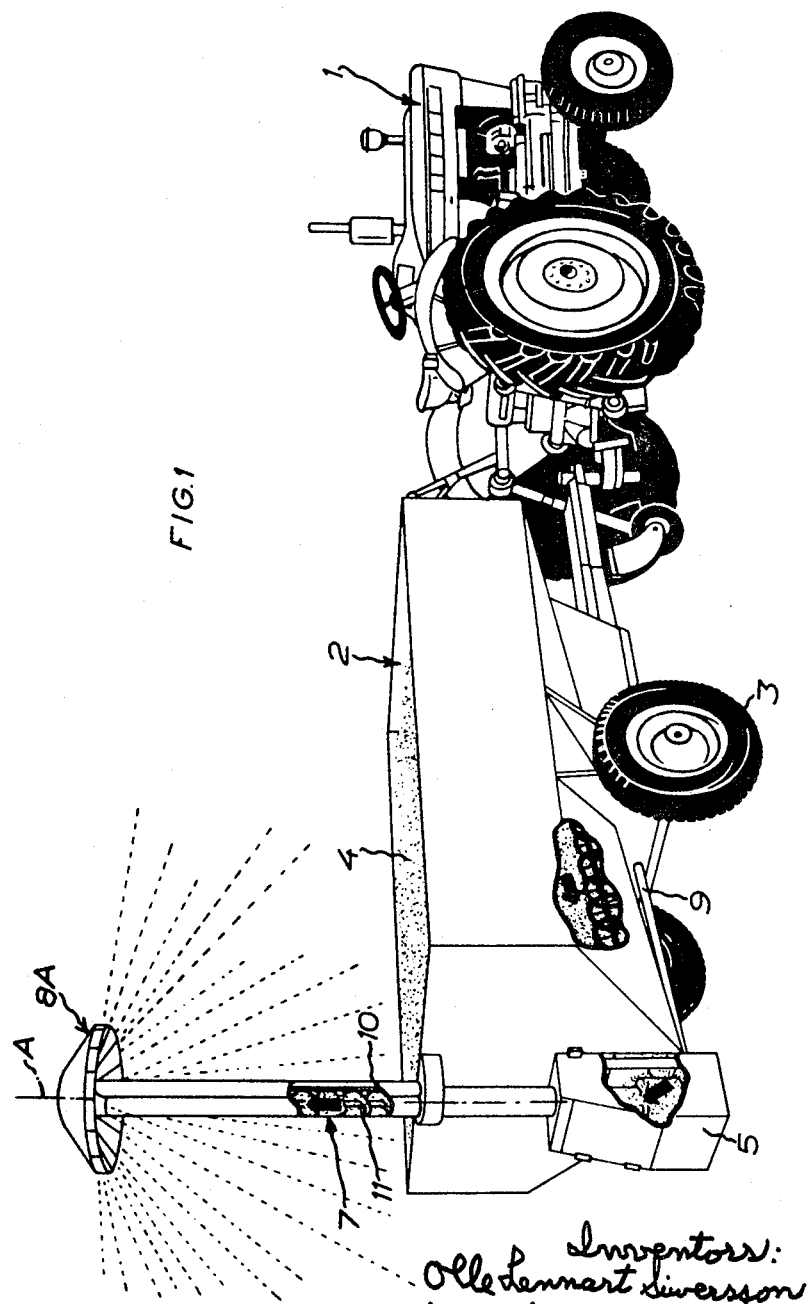

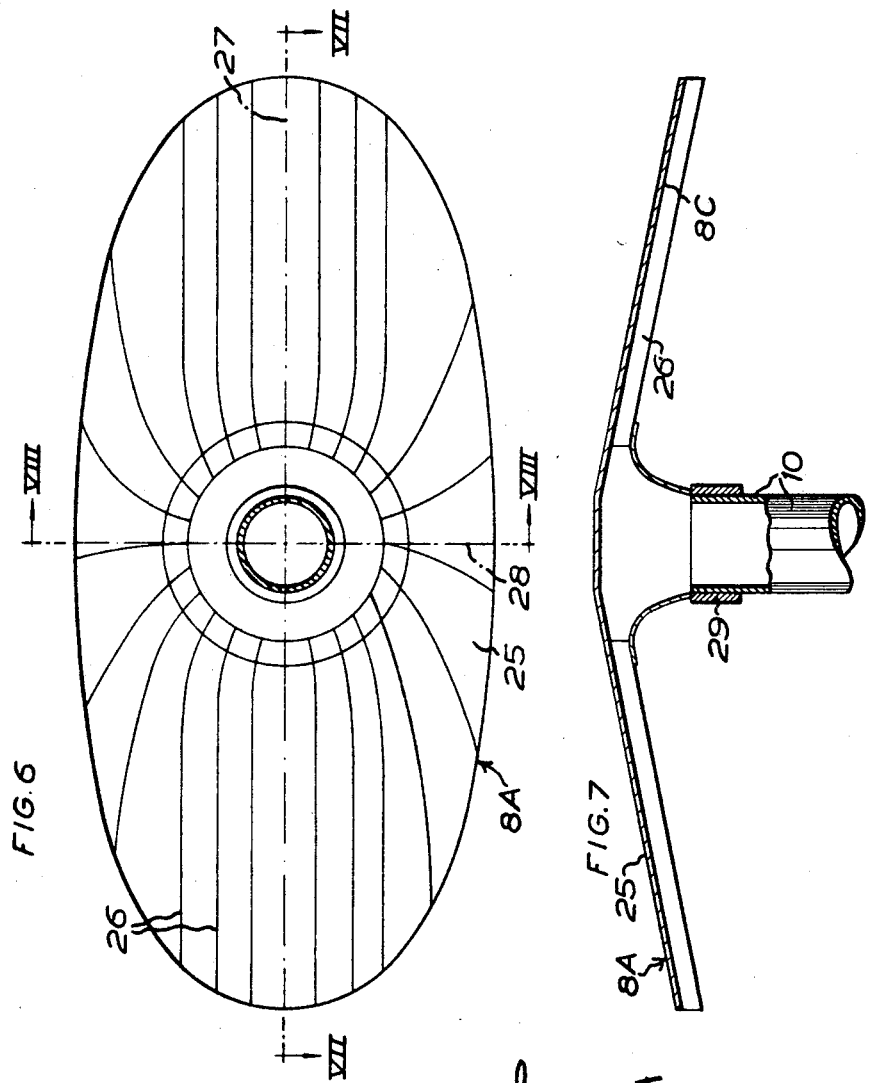

United States Patent Office 3,478,970
Patented Nov. 18, 1969

3,478,970
MANURE SPREADERS
Olle Lennart Siwersson, Gartnergatan 4, and Karl Gunnar Tell, Malmogatan 3, both of Halsingborg, Sweden
Filed Apr. 1, 1968, Ser. No. 717,692
Int. Cl. A01c 17/00
U.S. Cl. 239—687　　　　　　　　　　　　　　6 Claims

ABSTRACT OF THE DISCLOSURE

A spreader for manure having a conveyor extending upwardly beyond a supply container, said conveyor consisting of a screw and a rotatable housing, and spreading means at the upper end of the housing to be carried along by the housing in the rotation thereof.

---

Figure 8:
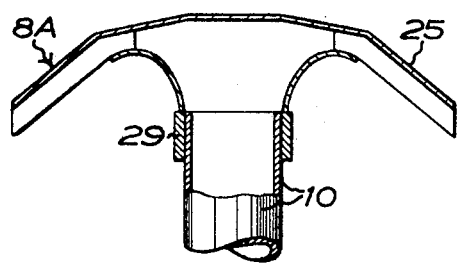

This invention relates to a spreader for natural or artificial manure having a supply container, a conveyor projecting upwardly over the supply container and the manure spreader and comprising a conveyor screw and a cylindrical housing therefor, and spreading means mounted at the upper free end of the conveyor and rotatable about an axis common to the screw, the housing and the spreading means.

In a prior art machine of related nature the conveyor screw rotates in a stationary housing and the spreading means are connected with the screw to be carried along by and rotate together with the screw. This implies the disadvantage that the material to be spread which leaves the upper end of the screw in an upward direction and substantially axially of the screw and is projected over the upper edge of the stationary housing has to be deflected downwards and guided towards the upwardly facing guide surfaces of the spreading means to be thrown out by said guide surfaces in the spreading direction contemplated. As a consequence, the material to be spread will be stopped up and the spreading range restricted simultaneously as the material to be spread will be more sensitive to wind and weather conditions while moving away from the machine to the ground.

The combination suggested by the present invention, viz. that the housing is arranged to be rotated about its longitudinal axis and the spreading means are mounted at the free end of the housing to be carried along in the rotation thereof, permits releasing the material to be spread at the side of the housing and to exploit the centrifugal force in the rotating housing to impart to the material an initial movement which is accelerated by the spreading means. This will considerably increase the spreading range.

Due to the spreading means having downwardly facing and downwardly-outwardly inclined guide surfaces for the manure to be spread it is possible to keep the manure better collected during its movement between the spreader and the ground; at the same time the manure will be more uniformly distributed over the ground.

A still more uniform distribution is obtained by making the spreading means in the form of a conical downwardly widening, preferably oval cap of varying conicity, whose downwardly facing surface is divided by means of projections, such as ribs, into a number of guide surfaces for the manure, and the distance between the projections or ribs increases from the major axis to the minor axis of the cap while the inclination of the guide surfaces increases from the region of the major axis to that of the minor axis.

By the spreading means having the form of tubes whose length and inclination vary from a maximum length and minimum inclination in one direction to a minimum length and maximum inclination in another direction, they will be of simple and cheap construction.

By designing the spreading means in the form of two axially spaced frustoconical caps which are divided into sectors in which the average conicity of two opposed sectors is the same, but the average conicity of two adjacent sectors is different, one obtains a resistant and unsensitive spreading apparatus.

By making the upper end of the stationary screw extend upwardly beyond the lower edge of the discharge opening or openings of the cylindrical conveyor screw housing at the upper free end thereof a distance such that approximately 180° to 270° of the periphery of said upper screw end is free, and by directing said free outlet-forming portion of said end substantially rearwardly as viewed in the direction of travel of the manure spreader the manure will be spread on the whole only rearwardly and laterally of the manure spreader.

The above features of the invention and the advantages gained thereby will appear from the following specification in which reference is made to the accompanying drawings.

Figure 9:
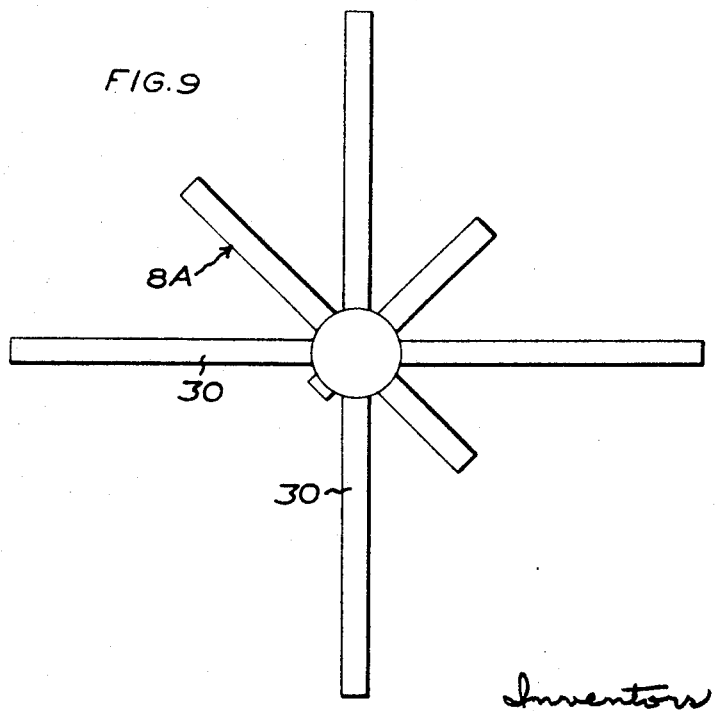
Figure 10:
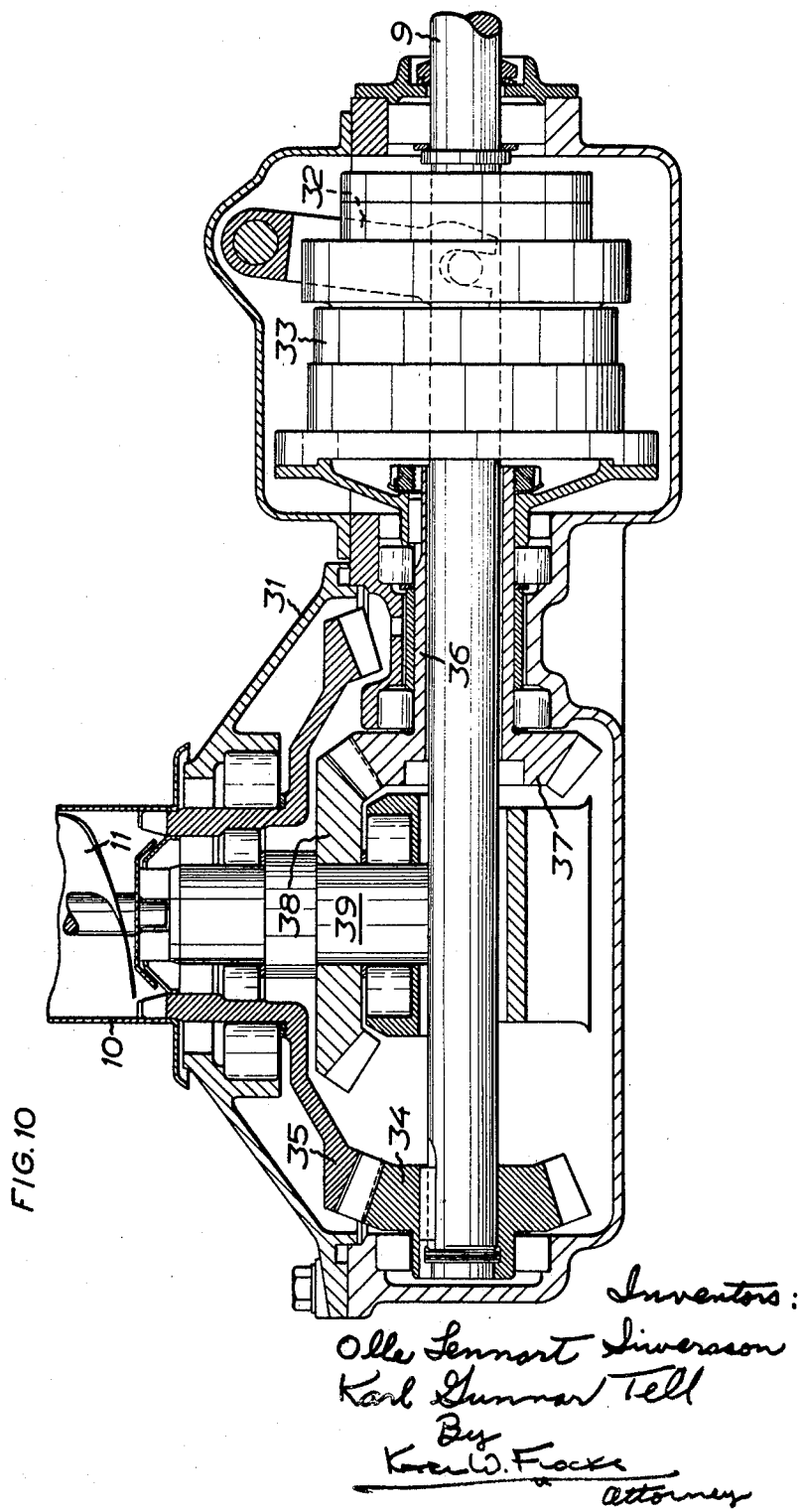

In the drawings:
FIGURE 1 is a perspective view of a manure spreader to be towed by a tractor;
FIGURE 2 is a section of the spreading device of the manure spreader;
FIGURE 3 is a plan view of the spreading device;
FIGURE 4 is a section of modification of the spreading device;
FIGURE 5 is a plan view of the modification shown in FIGURE 4;
FIGURE 6 is a plan view, as seen from below, of a further modification of the spreading device;
FIGURE 7 is a section on line VII—VII in FIGURE 6;
FIGURE 8 is a section on line VIII—VIII in FIGURE 6;
FIGURE 9 is a plan view of a further modification of the spreading device; and
FIGURE 10 is a section of part of a transmission in the manure spreader.

In FIGURE 1 the tractor is designated 1 and the manure spreader 2. The manure spreader is supported by wheels 3 and has a manure supply container 4 and a transmission 5 for driving a conveyor 7 extending upwardly beyond the supply container 4 and serving to convey manure from the container 4 to a spreading device 8A mounted at the upper free end of the conveyor and including spreading means 8B. In the following embodiment, described in detail, the transmission 5 is connected via a shaft 9 to the power take-off (not shown) of the tractor 1. The conveyor 7 comprises a cylindrical housing 10 and a conveyor screw 11 therein. The conveyor 7 and the spreading device 8A are rotatable about an axis A indicated by a dash-and-dot line in FIGURE 1 and common to the screw 11, the housing 10 and the spreading device 8A.

In accordance with the invention, the housing 10 is arranged to be rotated about the axis A, and the spreading device 8A is attached to the free end of the housing 10 to be carried along by the housing in the rotation thereof.

In the embodiment shown in FIGURES 2 and 3 the spreading means 8B have downwardly facing and downwardly-outwardly inclined guide surfaces 8C for the manure to be spread. The guide surfaces 8C are formed by one lower surface in the upper one of two axially spaced frusto-conical caps 12 and 13 which are interconnected via a number of radially extending walls 14. The said walls 14 divide the caps 12 and 13 into sectors. The upper cap 12 has a larger conicity than the lower cap 13. The space 16 between the caps 12 and 13 communicates via openings 17 in the sidewall of the housing 10 with the hollow space 18 of the housing 10. A hub 19 forms a bearing for the housing 10 on the screw 11. Owing to the caps 12 and 13 the spreading device 8A will have the form of a cone which has its major end directed downwardly. Such a form of the spreading device 8A will make it possible for the device to throw the artificial manure, which now mostly is in the shape of granules, with great force towards the ground.

As will also appear from FIGURES 2 and 3 the upper end of the screw 11 extends upwardly beyond the upper edge of the housing 10 a distance such that approximately 180° to 270° of the screw periphery is free and defines an outlet or mouth for the discharge of the material to be spread, and the mouth has its free outlet end directed substantially rearwardly as viewed in the direction of travel of the manure spreader. As a consequence, the artificial manure delivered by the spreading means 8B will be spread on the whole only rearwardly and laterally of the manure spreader. That part of the uppermost thread of the screw 11 which extends upwardly beyond the lower edge of the openings 17 will thus form a shielding means which prevent manure from being transmitted to a certain part of the spreading device 8A and thus from being thrown towards the tractor itself.

In the modification of the spreading means 8B shown in FIGURES 4 and 5 the caps 12 and 13 have such sectors 20, 21 and 22 that the average conicity of two opposed sectors will be the same while the average conicity of two adjoining sectors will be different. Therefore, the conicity of the caps 12 and 13 will thus change from one sector to the other and the guide surfaces 8C at the underside of the cap 12 will thus have alternating inclinations.

In the embodiment of the spreading device 8A shown in FIGURES 6 and 8 the spreading device is in the form of a single cap 25 of varying conicity, which widens downwardly. In plan view the cap 25 is preferably oval. The downwardly facing guide surface 8C of the cap 25 is divided by projections or ribs 26 into a great many guide surfaces for the manure, and the distance between the projections or ribs 26 will increase from the major axis of the cap, which is indicated by a dash-and-dot line 27, to the minor axis of the cap, indicated by a dash-and-dot line 28. Moreover, the inclination of the guide surfaces increases from the region of the major axis 27 to the region of the minor axis 28, as will appear particularly clearly from a comparison between FIGURES 8 and 9. The cap 25 is fastened to the upper edge of the housing 10 by means of a ring 29. For a simpler manufacture of the cap 25 some of the ribs 26 adjacent to the major axis 27 may, as indicated in the embodiment illustrated, predominantly extend in parallel with, and spaced like distances apart from, each other.

In the embodiment shown in FIGURE 9 the spreading device 8A comprises a number of tubes of varying length and inclination. The longest tubes have an inclination of about 11° with respect to a horizontal plane above the tubes, while the corresponding inclination of the shortest tube is about 50°. Depending upon the length those tubes which are shorter than the longest tube but longer than the shortest tube, may have an inclination of e.g. 15°, 22° and 39°.

By maintaining the screw 11 stationary in the rotating cylindrical housing 10 and the rotating spreading device 8A, the manure to be spread can be caused to fall in the region rearwardly and laterally of the manure spreader, as already mentioned in the foregoing. The spreading device 8A is adapted to be rotated at such a rate that the manure to be spread is given an initial speed of more than 5 meters per second. An initial speed of 20 meters per second has proved suitable. However, if the screw also is rotated in such a direction that a conveying effect towards the spreading device is obtained, an unexpectedly high conveying capacity will result compared to that of a screw which rotates in a stationary housing or of a housing which rotates in relation to a stationary screw. In this case one cannot as with a stationary screw control the spreading direction by means of the stationary screw in a simple manner, but one must provide means for shielding the flow of material directed towards the tractor and lead it back to the supply container of the spreader. Nevertheless, one obtains a spreading capacity which justifies an arrangement in which the screw and the housing rotate at substantially the same r.p.m. and at the same peripheral speed since the outer diameter of the screw and the inner diameter of the housing are almost equal.

In the embodiment illustrated the shaft 9 is introduced into a box 31 enclosing a clutch 33 operable in a suitable way by means of a fork 32 from the tractor driver's seat. A bevel gear 35 connected with the housing 10 is actuated via the shaft 9 and a bevel gear 34 on the end of said shaft mounted in the box 31. A sleeve 36 surrounding the shaft 9 is mounted in the box 31 and at the end of the sleeve facing the clutch 33 said sleeve can be caused to rotate when the clutch is drivably connected with the shaft 9. Mounted on the end of the sleeve 36 facing away from the clutch is a bevel gear 37 which is in mesh with a bevel gear 38 secured to a shaft 39 which is mounted in the box 31 and which has its upwardly directed end drivably connected with the screw 11.

At the propulsion and operation of the manure spreader and upon engagement of the clutch 33 both the housing 10 and the screw 11 will thus rotate, providing the advantageous effect already described. Owing to the clutch 33 the screw 11 can be engaged after the housing 10 has been caused to rotate. The clutch also makes it possible to keep the screw stationary while the housing is rotating.

What we claim and desire to secure by Letters Patent is:

1. A spreader for natural or artificial manure having a supply container, a conveyor extending upwardly beyond the supply container and the manure spreader and comprising a conveyor screw and a cylindrical housing therefor, and spreading means mounted at the upper free end of the conveyor and rotatable about an axis common to the screw, the housing and the spreading means, wherein the housing is arranged to be rotated about its longitudinal axis and the spreading means are secured to the free end of the cylindrical housing to be carried along by the housing in the rotation thereof.

2. A manure spreader in accordance with claim 1, wherein the spreading means have downwardly facing and downwardly-outwardly inclined guide surfaces for the manure.

3. A manure spreader in accordance with claim 1, wherein the spreading means comprise a conical, downwardly widening cap which is preferably oval in plan view and of varying conicity, said cap having its downwardly facing surface provided with projections, such as ribs, to divide said surface into a number of guide surfaces for the manure, and the distance between the projections or ribs increases from the major axis of the cap to the minor axis thereof while the inclination of th guide surfaces increases from the region of the major axis to that of the minor axis.

4. A manure spreader in accordance with claim 1, wherein the spreading device comprises tubes whose length and inclination vary from a maximum length and minimum inclination in one direction to a minimum length and maximum inclination in another direction.

5. A manure spreader in accordance with claim 1, wherein the spreading device comprises two axially spaced frustoconical caps which are divided into sectors in which the average conicity of two opposed sectors is the same but the average conicity of two adjacent sectors is different.

6. A manure spreader in accordance with claim 1, wherein the upper end of the screw extends upwardly beyond the lower edge of the outlet openings of the housing at the upper free end thereof a distance such that about 180° to 270° of its periphery is free, the free outlet forming portion of said upper conveyor screw end being directed substantially rearwardly as viewed in the direction of travel of the manure spreader.

References Cited

UNITED STATES PATENTS

| | | | |
|---|---|---|---|
| 101,136 | 3/1870 | Kurtz | 239—686 |
| 242,402 | 5/1881 | Waddell | 239—686 |
| 291,433 | 1/1884 | Waddell | 239—686 |
| 588,367 | 8/1897 | Taylor | 239—653 |
| 619,055 | 2/1899 | Taylor | 239—653 |
| 2,758,842 | 8/1956 | Burroff | 239—687 |

EVERETT W. KIRBY, Primary Examiner

U.S. Cl. X.R.

239—653, 675, 683, 684, 686